(12) United States Patent
Azibert

(10) Patent No.: US 6,761,359 B2
(45) Date of Patent: Jul. 13, 2004

(54) SPACING ELEMENT FOR CENTERING COMPONENTS IN A MECHANICAL SEAL AND FOR PROMOTING CIRCULATION OF A SEAL FLUID THEREIN

(75) Inventor: Henri V. Azibert, Windham, NH (US)

(73) Assignee: A. W. Chesterton Company, Stoneham, MA (US)

( * ) Notice: Subject to any disclaimer, the term of this patent is extended or adjusted under 35 U.S.C. 154(b) by 0 days.

(21) Appl. No.: 09/967,100

(22) Filed: Sep. 28, 2001

(65) Prior Publication Data

US 2002/0089123 A1 Jul. 11, 2002

Related U.S. Application Data

(60) Provisional application No. 60/236,565, filed on Sep. 29, 2000.

(51) Int. Cl.[7] .................................................. F16J 15/34
(52) U.S. Cl. ....................... 277/370; 277/371; 277/374; 277/375
(58) Field of Search ................................ 277/358, 370, 277/371, 374, 375

(56) References Cited

U.S. PATENT DOCUMENTS

| 3,026,114 | A | * | 3/1962 | Anderson | 277/408 |
| 5,209,496 | A | | 5/1993 | Azibert et al. | 277/9 |
| 5,820,129 | A | | 10/1998 | Reagan | 277/1 |
| 6,428,011 | B1 | * | 8/2002 | Oskouei | 277/358 |
| 6,446,975 | B1 | * | 9/2002 | Bratthall | 277/366 |

FOREIGN PATENT DOCUMENTS

| EP | 658 713 A1 | 6/1995 |
| EP | 658 714 A1 | 6/1995 |

* cited by examiner

Primary Examiner—Anthony Knight
Assistant Examiner—E Peavey
(74) Attorney, Agent, or Firm—Lahive & Cockfield, LLP; Anthony A. Laurentano, Esq.

(57) ABSTRACT

A mechanical seal for mounting to a stationary housing that contains a rotating shaft is provided. The mechanical seal employs an inboard mounted spacer element to provide axial and radial spacing between a holder and a gland. In addition to providing selected axial and radial spacing, the spacer element promotes or enhances fluid circulation in a process chamber formed between the gland and holder by rotating about the shaft.

49 Claims, 5 Drawing Sheets

SPACING ELEMENT FOR CENTERING COMPONENTS IN A MECHANICAL SEAL AND FOR PROMOTING CIRCULATION OF A SEAL FLUID THEREIN

REFERENCE TO RELATED APPLICATIONS

This application claims priority to U.S. Provisional Patent Application No. 60/236,565, filed Sep. 29, 2000, the contents of which are hereby incorporated by reference.

TECHNICAL FIELD

The present invention relates to mechanical seals, and specifically relates to the use of spacer elements suitable for use in mechanical seals for radially and axially positioning selected seal components.

BACKGROUND OF THE INVENTION

Mechanical seals are employed in a wide variety of mechanical apparatuses to provide a pressure-tight and fluid-tight seal. The mechanical seal is usually positioned about a rotating shaft that is mounted in and protruding from a stationary housing. The seal is usually bolted to the housing at the shaft exit, thus preventing the loss of pressurized fluid from the housing.

Conventional mechanical seals include face type mechanical seals, which include a pair of sealing rings that are concentrically disposed about the shaft, and axially spaced from each other, as described in U.S. Pat. No. 5,725,220, the contents of which are hereby incorporated by reference. The sealing rings each have sealing faces that are biased into sealing contact with each other. Usually, one seal ring remains stationary, while the other ring contacts the shaft and rotates therewith. The mechanical seal prevents leakage of the pressurized process fluid to the external environment by biasing the seal ring sealing faces in sealing contact with each other. The rotary seal ring is usually mounted in a holder, which is disposed in a chamber formed by a gland. The gland is usually centered on the stationary housing and secured thereto.

Conventional mechanical seals, such as cartridge type seals, employ centering mechanisms to radially space selected seal components, such as the gland and/or holder from the shaft of a housing. Conventional methods for centering the gland include using a number of elongated tabs mounted on the exterior or outboard portion of the mechanical seal. The tabs protrude evenly into the gland, thereby centering the shaft and holder.

A drawback of employing conventional centering mechanisms is that they can typically be lost or misplaced. Another drawback of the conventional seals is that the conventional centering mechanisms center the shaft at the outboard end of the seal. In applications where there is a minimal distance between the seal outboard end and an axial obstruction, it is generally difficult to access the centering mechanism. Consequently, it is difficult to center the gland relative to the shaft. Additionally, the tabs can become disengaged from the seal, increasing the likelihood that the tabs can become lost. Further, conventional seals employing centering mechanisms add distance to the overall length of the seal, which can preclude the use of the seal in a number of applications.

Still another drawback of conventional centering mechanisms is that they only provide radial spacing of seal components and do not provide axial spacing of seal components relative to each other. A further drawback of conventional mechanical seals is that there is generally a relatively small radial spacing between the gland and holder of the mechanical seal. This relatively small spacing restricts the ability to circulate, if at all possible, fluid between the gland and the holder, and therefore restricts the ability to cool selected seal components.

SUMMARY OF THE INVENTION

The present invention provides a mechanical seal for mounting to a stationary housing that contains a rotating shaft. The mechanical seal employs an inboard mounted spacer element, which can be a separate element or can be integrally formed with one or more seal components, for providing axial and radial spacing between a holder and a gland. The spacer elements hence center the seal components about a shaft. The spacer element in addition to providing selected axial and radial spacing, further promotes or enhances fluid circulation in a process chamber formed between the gland and holder. The process chamber typically houses process fluid from the housing to which the seal is mounted. Circulating the process fluid within the process chamber aids or assists in cooling one or more seal components as well as preventing unwanted particulates present within the process fluid from packing up between one or more of the seal components. Hence, the spacer element of the present invention by promoting or enhancing the circulation of process fluid within the process chamber functions as a continuous flushing system to ensure that unwanted particles do not pack up within the chamber.

The geometry of the inner surface of the gland and the outer surface of the holder can be configured to optimize, promote or enhance the circulation of process fluid within the process chamber.

According to one aspect, a mechanical seal for mounting to a housing containing a rotating shaft is provided. The mechanical seal comprises a gland having an inner surface and a holder having an outer surface and disposed about said shaft in a selected position relative to the gland. The mechanical seal further comprises a spacer element disposed between the gland and the holder during operation of the seal for substantially uniformly separating the holder outer surface from the gland inner surface and for axially positioning the holder in the selected position relative to the gland.

According to another aspect, a mechanical seal for mounting to a housing containing a rotating shaft is provided. The mechanical seal comprises a gland having an inner surface and a holder having an outer surface and disposed about the shaft in a selected position relative to the gland. The gland inner surface is radially spaced from the holder outer surface to define a chamber. A rotatable spacer element is disposed between the gland and the holder for circulating a fluid through the chamber.

According to another aspect, a method for creating a bi-directional axial flow of fluid in a mechanical seal for sealing a housing containing a rotating shaft is provided. The method comprises providing one or more spacer elements, rotatably mounting the spacer elements between a gland having an inner surface and a holder defining an outer surface and disposed about said shaft in a selected position relative to the gland. The inner surface of the gland is radially spaced from the outer surface of the holder to define a chamber. The method further comprises rotating the spacer elements to induce the bi-directional axial flow through the chamber.

According to yet another aspect, a mechanical seal for mounting to a housing containing a rotating shaft is provided. The mechanical seal comprises a gland having an inner surface, a holder having an outer surface and disposed about said shaft in a selected position relative to the gland and a spacer element disposed between the gland and the holder during operation of the seal. The spacer element substantially uniformly separates the holder outer surface from the gland inner surface and axially positions the holder in the selected position relative to the gland. The inner surface of the gland is radially spaced from the outer surface of the holder to define a chamber, and the holder is positioned within said chamber. The spacer element circulates a fluid flow through the chamber.

According to a final aspect a mechanical seal for mounting to a housing containing a rotating shaft is provided. The mechanical seal comprises a gland having an inner surface a holder having an outer surface and disposed about said shaft in a selected position relative to the gland and a spacer element. The spacer element is disposed between the gland and the holder for positioning the holder relative to the shaft and for circulating a process fluid through a chamber defined by the gland inner surface and the holder outer surface.

Other general and more specific objects of the invention will in part be obvious and will in part be evident from the drawings and description which follow.

BRIEF DESCRIPTION OF THE DRAWINGS

The foregoing and other objects, features and advantages of the invention will be apparent from the following description and apparent from the accompanying drawings, in which like reference characters refer to the same parts throughout the different views. The drawings illustrate principles of the invention and, although not to scale, show relative dimensions.

DESCRIPTION OF ILLUSTRATED EMBODIMENT

The present invention provides a mechanical seal for mounting to a stationary housing that contains a rotating shaft. The mechanical seal includes a centering element for spacing selected seal components. The centering element provides significant improvements over the prior art by providing axial and radial spacing of the seal component in addition to providing a flushing system for a process chamber in the seal. Those skilled in the art will appreciate that the present invention may be implemented in a number of different applications and embodiments and is not specifically limited in its application to the particular embodiment depicted herein.

Figure 1:
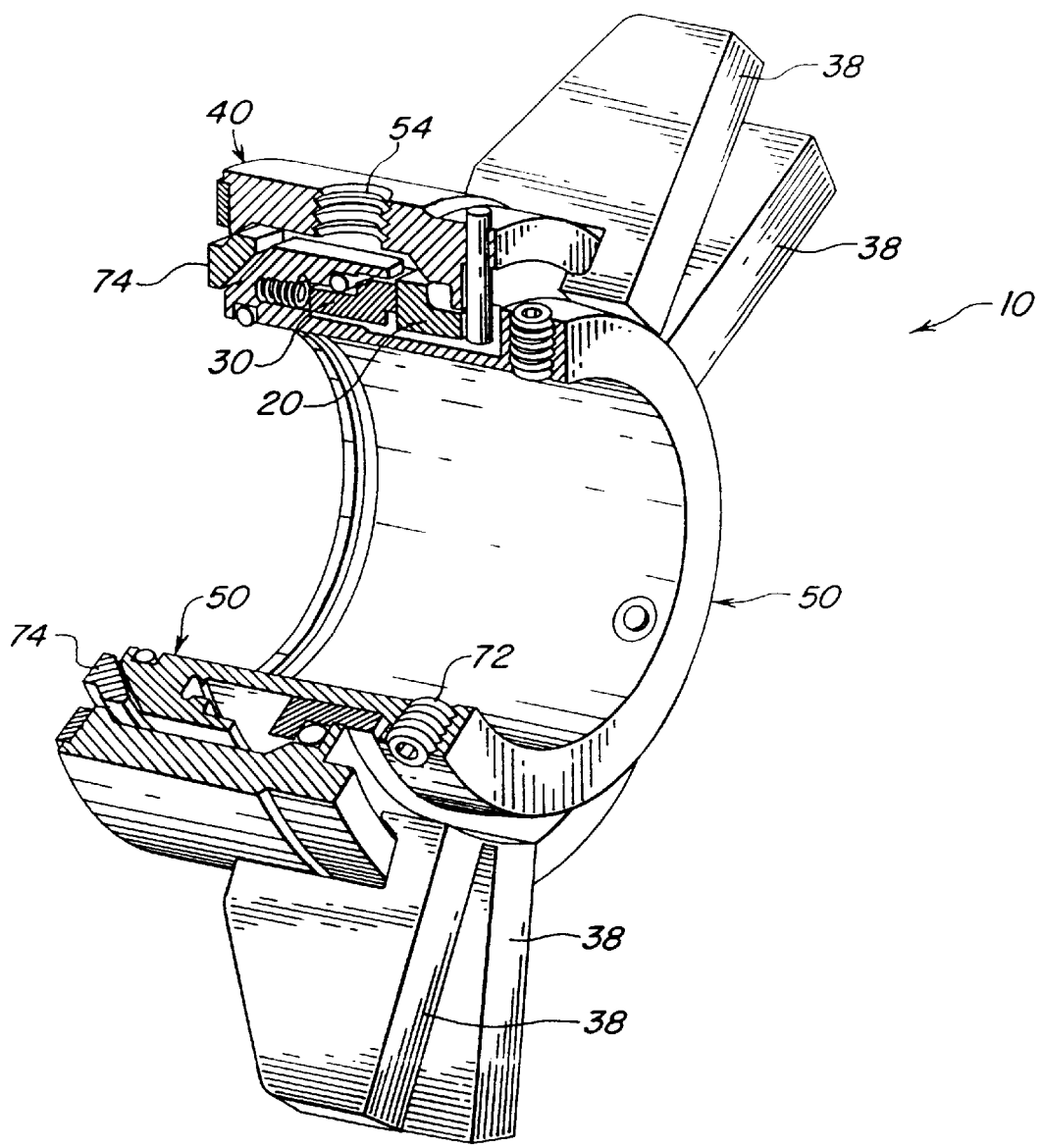
FIG. 1 is a perspective view of the mechanical seal of the present invention.
Figure 2:
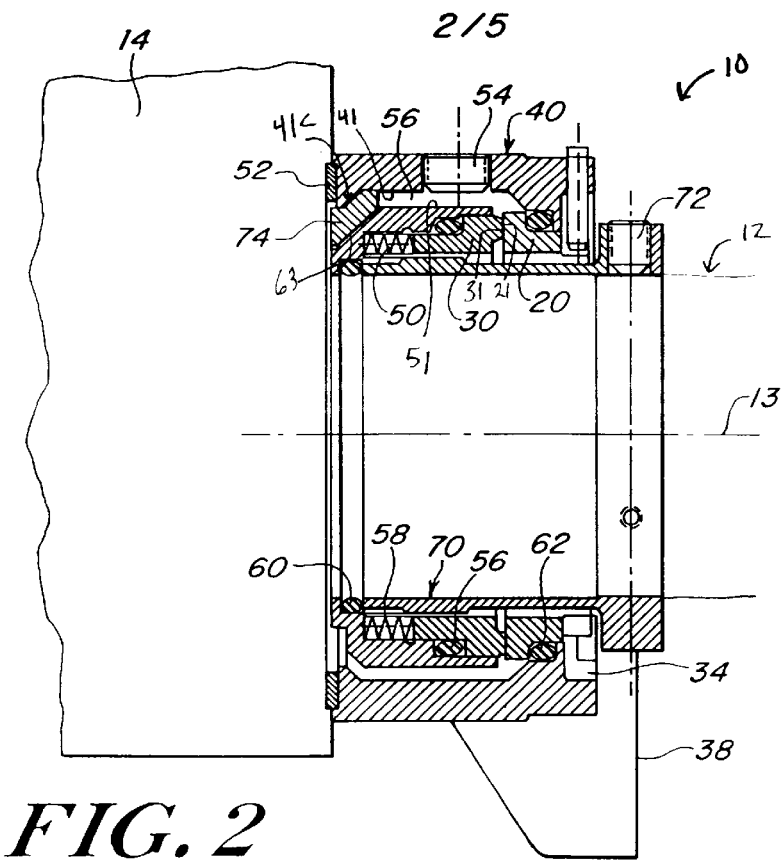
FIG. 2 is a cross-sectional view of the mechanical seal of FIG. 1 illustrating the positioning of the spacer element of the present invention.

FIGS. 1 and 2 illustrate a mechanical seal 10 having selected seal components and arrangements thereof in accordance with the teachings of the present invention. The illustrated mechanical seal 10 is preferably concentrically disposed about a shaft 12 that extends along a first axis 13 and is secured to an external wall of a machine housing 14, such as pump or the like. The shaft 12 is mounted, at least partly, within the housing 14, and has a portion that extends axially outwardly therefrom, over which seats the illustrated mechanical seal 10. The mechanical seal 10 constructed in accordance with the teachings of the present invention provides a fluid tight seal, thereby preventing a process fluid from escaping the housing 14. The fluid tight seal is achieved by a pair of seal rings 20 and 30, which include a first or rotating seal ring 30 and a second or stationary seal ring 20, each having a smooth arcuate sealing surface 21, 31. The smooth arcuate sealing surface of each seal ring 20 and 30 is biased into sealing contact with the corresponding surface of the other seal ring segment. According to an alternate embodiment, the seal rings 20 and 30 are split into a plurality of seal ring segments having segment sealing faces biased into sealing relationship with each other according to known techniques. The seal faces provide a fluid tight seal operable under a wide range of operating conditions. As substantially similar mechanical seal is described in U.S. Pat. No. 5,725,220, the contents of which are incorporated herein by reference.

The illustrated mechanical seal 10 includes, in addition to the rotary seal ring 30 and the stationary seal ring 20, a gland 40 and a holder 50. According to an alternate embodiment, the gland 40 includes a pair of generally identical gland segments, or comprises an assembly of several gland segments. The gland has an inner surface 41 that is configured to house the holder 50. The holder has an axially extending outer surface 51. The inner surface 41 of the gland is radially spaced from the outer surface 51 of the holder to define a process chamber 56. The gland 40 can include conventional grooves to house sealing components in order to prevent process fluid from leaking. In particular, the illustrated gland 40 includes a groove disposed at an inboard end, i.e. the end towards the housing 14, thereof that is sized and configured for seating a relatively flat gasket 52 that is placed in facing engagement with the housing 14. The illustrated gasket 52 prevents process fluid from leaking between the housing 14 and the mechanical seal 10.

The illustrated gland 40 further includes a plurality of bolt tabs 38 that extend outwardly therefrom. The bolt tabs have a main body that has an integrally formed inserting tab projection 36 that is adapted to mount in an annular channel 34 formed in the outer surface of the gland 40. The angular position of the bolt tabs 38 can be adjusted by sliding the tab projection 36 in the channel 34. The bolt tabs 38 help secure the mechanical seal to the housing 14 by seating mounting bolts (not shown) between adjacent ones of the tabs. In use, the mounting bolt is inserted between a pair of adjacent bolt tabs. The bolt tabs 38 are described in further detail in U.S. Pat. No. 5,209,496, assigned to the assignee hereof, which is here and incorporated by reference.

The gland 40 further includes a flush port 54 formed between inner and outer surfaces of the gland. The flush port 54 preferably allows communication between the process chamber 56 formed between the gland 40 and the holder 50 and an external environment, or any selected fluid source coupled thereto. The flush port 54 can have any selected configuration, and is preferably threaded in order to facilitate connection to any suitable fluid conduit.

With further reference to FIGS. 1–2, the illustrated holder 50 is disposed in the inner chamber 56 formed by the gland 40, and spaced radially inwardly therefrom. It should be understood, however, that the holder 50 need not be disposed within the gland 40. Rather, the holder 50 can be axially spaced from the gland 40 in a selected position, such that at least a portion of the holder protrudes from the gland. According to alternate embodiments, the holder 50 includes a pair of arcuate holder segments each identical to the other or, alternatively comprises an assembly of several holder segments. The holder 50 has an axially extending outer surface 51 and an axially extending inner surface 61.

The inner surface of one portion of the illustrated holder 50 includes a stepped shoulder for mounting an O-ring 57. The O-ring 57 preferably forms a fluid tight seal between the rotary seal ring 30 and the inner surface 61 of the holder 50. The inner surface of the holder 50 is further configured to mount a biasing member 58 for providing an axial biasing force to the rotary seal ring 30 in order to ensure that the seal faces of the seal rings 20 and 30 are disposed in sealing contact with each other. Moreover, a shaft seal 60 is provided for providing a seal between an inner surface of the holder 50 and the shaft 12. The inner surface of the holder segment is configured similar to a sleeve and is mechanically coupled to the shaft 12 by a lock ring 72.

The illustrated mechanical seal 10 further includes an O-ring 62 mounted in a selected groove formed between an inner surface 41 of the gland 40 and an outer surface of the stationary seal ring 20. The illustrated sealing element 62 preferably forms a fluid tight seal between the stationary seal ring 20 and the inner surface 41 of the gland 40. The O-ring 62 preferably prevents process fluid housed within the process chamber 56 from escaping to the external environment.

The illustrated rotary seal ring 30 has a substantially smooth arcuate inner surface and an outer surface. Likewise, the illustrated stationary seal ring 20 has a relatively smooth inner surface and an outer surface.

The illustrated mechanical seal 10 further includes one or more spacer elements 74 disposed between the gland 40 and the holder 50. The illustrated spacer element 74 can be a separate element disposed and supported between the gland and holder, or can be integrally formed with any selected seal component. For example, the spacer element 74 can be integrally formed or mounted on the outer surface 51 of the holder 50. The illustrated spacer element 74 is adapted to center the holder 50 relative to the gland 40. According to one practice, the illustrated spacer element 74 comprises a plurality of spacer elements circumferentially and/or evenly spaced about the outer surface of the holder 50. The spacers are preferably formed of a suitable material, such as teflon, that can prevent, if desired, unwanted and inadvertent scoring of any of the components. One skilled in the art will recognize that any suitable number of spacer elements 74 may be employed. Additionally, the spacer elements 74 are not limited to being formed on or mounted on the holder outer surface 51, but can be formed at various holder locations.

The illustrated spacer elements 74 are preferably disposed within the chamber 56 at an inboard seal end, such that an outer surface thereof adjoins the inner surface 41 of the gland 40, and an inner surface thereof adjoins an outer surface 51 of the holder 50. The spacing formed between the spacer elements 74 and the gland 40 and holder 50 enables process fluid to flow or circulate past the spacer elements. The illustrated spacer elements 74 are preferably rotatably mounted such that, when the mechanical seal 10 is mounted to the shaft 12, the spacer elements rotate thereabout with the other rotatable seal components. In addition to spacing the holder 50 from the gland 40, the rotatable spacer elements 74 induce flow of the process fluid within the process fluid chamber 56. The recirculation of the process fluid created by the rotation of the spacer elements cools selected seal components during use, as well as prevents any particulate matter present within the process fluid from packing up within the process chamber 56. Hence, the spacer elements 74, when rotated, act as a flushing system for the process chamber 56.

According to an alternate embodiment, the spacer elements 74 are rigidly mounted, for example, on the inner surface 41 of the gland 40. In this embodiment, rotation of the holder 40 about the shaft effects a flow of the process fluid and the stationary spacer elements 74 direct the flow of process fluid through the process chamber 56.

The process chamber 56 further has relatively selected dimensions, between about 0.020 and about 0.5 inches, and preferably on the order of about 0.125 inches, to provide sufficient and adequate spacing between the components to allow passage of the recirculating process fluid. Further, the size of the process chamber 56 is relatively large compared with conventional chambers such that it enables the spacer elements 74 to promote, enhance or initiate process fluid recirculation therein. Those of ordinary skill will readily recognize that the outer surface of the holder 50 and the inner surface of the gland 40 can be especially configured to promote, enhance or facilitate the recirculation of the process fluid within the process chamber 56.

Figure 2A:
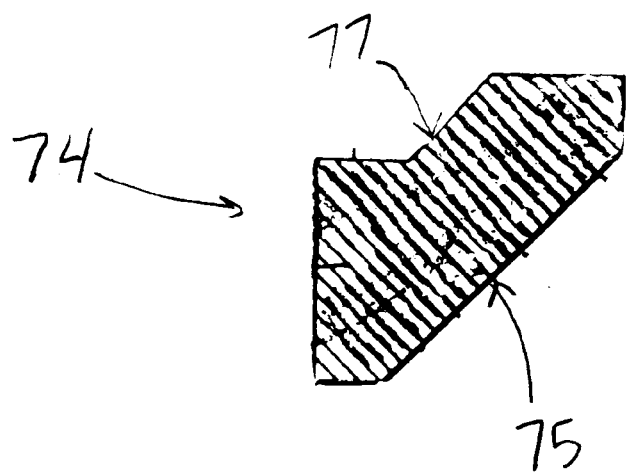
FIG. 2a is a cross-sectional view of the spacer element of FIG. 1 of the present invention

The spacer elements are configured to both radially and axially space the seal components. As shown in FIG. 2a, the centering element 74 is configured to prevent axial movement of the seal components. As shown in FIG. 2, the holder outer surface 51 of the mechanical seal 10 extends radially inwards at the inboard end of the holder to form a tapered surface 63. The spacer element 74 includes a sloped inner surface 75, shown in FIG. 2a, complementary to and configured to adjoin the tapered surface 63. The gland inner surface 41 comprises a first axially extending surface, a second axially extending surface and a sloped surface 41c extending between the first axially extending surface and the second axially extending surface at an axially inboard end of the gland 40. The spacer element 74 has a sloped outer surface 77 complementary to and configured to adjoin the sloped surface 41c of the gland. The spacer element 74 is disposed between the gland and the holder such that the sloped outer surface 77 adjoins the sloped surface 41c of the gland and the sloped inner surface 75 adjoins the tapered surface 63 of the holder 50. In this manner, the spacer element 74 provides axial spacing of the seal components in addition to radial spacing of the seal components.

Figure 3:
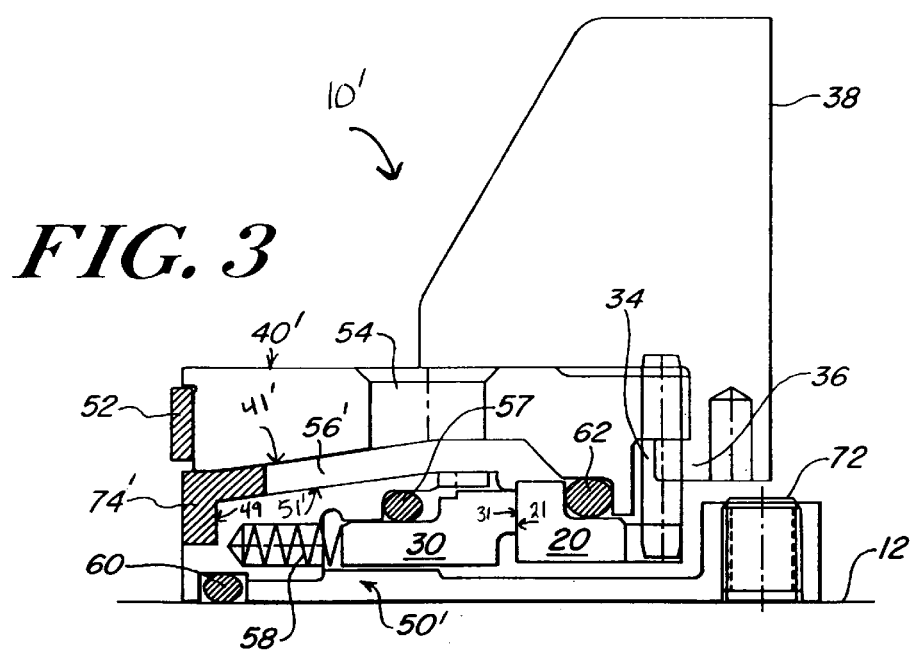
FIG. 3 is a cross-sectional view of the mechanical seal according to an alternate embodiment of the present invention.
Figure 3A:
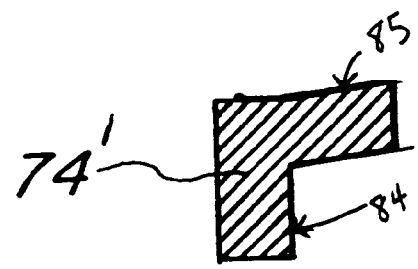
FIG. 3a is a cross-sectional view of the spacer element of the mechanical seal of FIG. 3.

FIGS. 3 and 3a illustrate the mechanical seal 10' according to an alternate embodiment. The mechanical seal 10' includes many of the same components as those described in relation to mechanical seal 10, with like parts being designated with like reference numerals. According to the alternate embodiment shown in FIGS. 3 and 3a, the spacer element 74' has a substantially L-shaped cross-section to provide axial and radial spacing of the seal components. As illustrated in FIG. 3, the holder 50' includes a groove 49 disposed at an axially inboard end thereof that is sized and configured for holding a first leg 84 of the spacer element 74'. The protrusion 84 of the spacer element 74' is seated within the annular groove 49 to axially position and space the holder relative to the gland. A second leg 85 of the L-shaped spacer element 74' is disposed in the process chamber 56' defined by the gland inner surface 41' and the holder outer surface 51' to radially position the holder relative to the gland.

Figure 4:
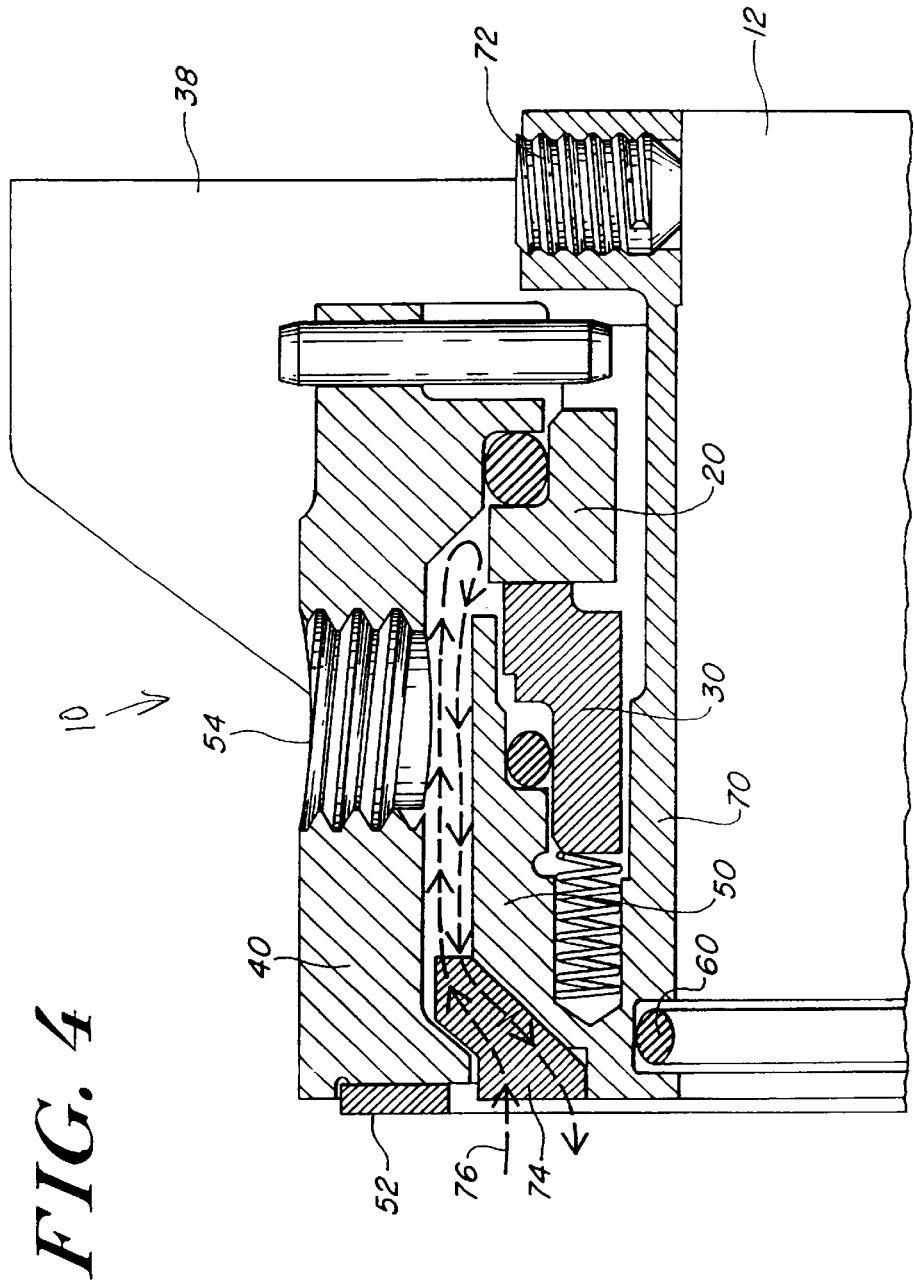
FIG. 4 is a schematic depiction of the recirculation of the process fluid within the process chamber of the mechanical seal of FIG. 1 according to the teachings of the present invention.

The flow of the process fluid within the process chamber 56 is illustrated by the circulation arrows 76, FIG. 4. As illustrated, the spacer element 74 effects a bi-directional axial exchange of fluid between the housing and a sealing area of the seal. During operation, the sleeve, holder and rotary seal ring 30 rotate with the shaft. The rotation of these components also rotates the spacer elements 74 disposed within the process chamber 56 during operation of the seal. The rotation of the spacer elements 74 promotes or enhances the circulation of the process fluid within the process chamber 56, as illustrated by the arrow 76.

Figure 6:
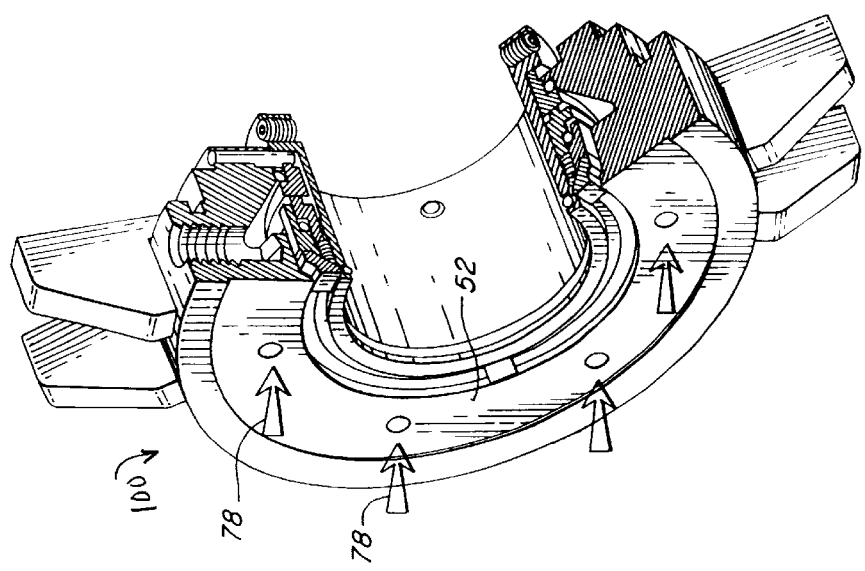
FIG. 6 is a perspective view of the mechanical seal of FIG. 5.
Figure 5:
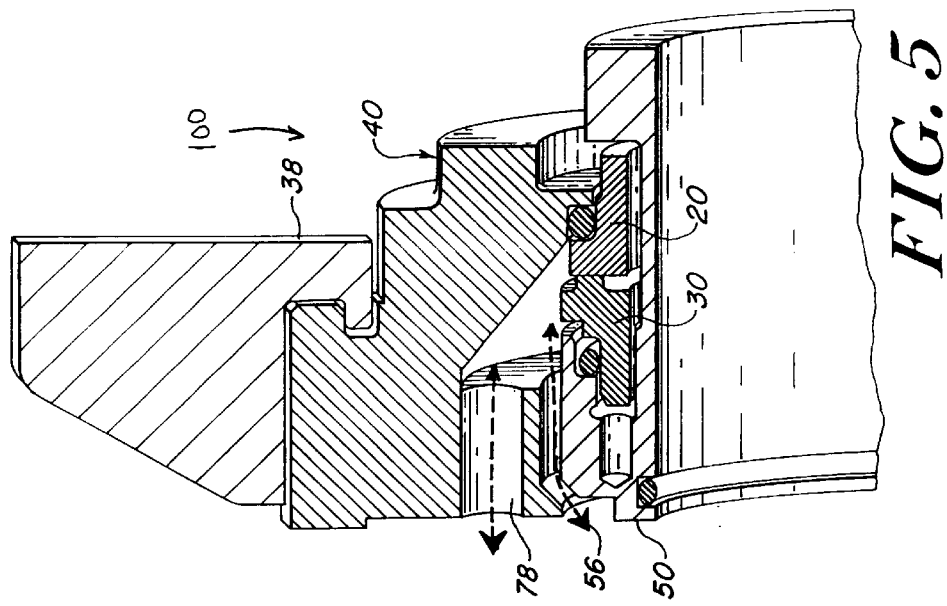
FIG. 5 is another embodiment of the mechanical seal having a recirculation port formed therein for recirculating process fluid.

FIGS. 5 and 6 illustrate an alternate embodiment of the mechanical seal of the present invention. The illustrated mechanical seal 100 includes many of the same components as those described in relation to mechanical seal 10, with like parts being designated with like reference numerals. The gasket 52 and the gland 40 can be configured to have a circulation port 78 formed therein. The circulation port 78 is preferably in fluid communication with the process chamber 56, and therefore enables the process fluid present within the housing 14 and seal 100 to circulate through the port 78 and hence provides the bi-directional exchange of process fluid through the process chamber 56.

In operation, the mechanical seal 10, 10' or 100 is mounted about the shaft 12 and is placed in contact with the housing 14. The gland bolts are placed between bolt tabs 38 to secure the seal to the housing. The screws on the lock rings 72 are then tightened to secure the holder 50 to the shaft. The spacer elements 74 hence automatically center the gland from the holder, and centers both the gland and the holder about the shaft 12. If the spacer elements 74 are integrally formed with the holder 50, they need not be removed from the seal prior to operation.

The seal ring 30 is further coupled to the rotatable holder 50, and hence rotates therewith. The spacer elements, which are coupled to the holder, also rotate. The rotation of the spacer elements 74 establishes, promotes, or enhances the recirculation of the process fluid within the process fluid chamber 56. Alternatively, the spacer elements are rigidly mounted on the gland or another stationary component, and the rotation of the holder 50 induces a flow of process fluid around the stationary spacer elements 74. The stationary spacer elements direct and recirculate the process fluid through the process chamber 56. The recirculation of the process fluid cools the seal faces of the seal rings 20 and 30 as well as other components. Moreover, the recirculation of the process fluid prevents, inhibits or eliminates the build up of particulates present within the process fluid.

The foregoing design further isolates the biasing member or spring from the process fluid, and hence increases the useful life thereof.

It will thus be seen that the invention efficiently attains the objects set forth above, among those made apparent from the preceding description. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and protected by Letters Patent is:

1. A mechanical seal for mounting to a housing containing a rotating shaft, said mechanical seal comprising:
   a gland having an inner surface
   a holder coupled to the rotating shaft and having an outer surface and disposed about said shaft in a selected position relative to the gland; and
   a spacer element disposed between the gland and the holder during operation of the seal for substantially uniformly separating the holder outer surface from said gland inner surface and for axially positioning the holder in said position relative to the gland, wherein the spacer element separates the holder outer surface from the gland inner surface by a distance of between about 0.020 and about 0.5 inches.

2. The mechanical seal of claim 1, wherein the inner surface of the gland is radially spaced from the outer surface of the holder to define a chamber, wherein the holder is positioned within the chamber.

3. The mechanical seal of claim 1, wherein the spacer element is coupled to the outer surface of the holder.

4. The mechanical seal of claim 1, wherein the spacer element is integrally formed on the outer surface of the holder.

5. The mechanical seal of claim 1, wherein the spacer element is configured to rotate about the rotary shaft.

6. The mechanical seal of claim 5, the inner surface of the gland is radially spaced from the outer surface of the holder to define a chamber and rotation of the spacer element induces a flow of fluid into the chamber.

7. The mechanical seal of claim 6, wherein the gland further includes a circulation port, and wherein rotation of the spacer element induces a flow of fluid through the chamber via the circulation port.

8. The mechanical seal of claim 6, wherein the spacer element is positioned at an axially inboard seal end of the chamber.

9. The mechanical seal of claim 6, wherein the spacer element comprises a plurality of spacer elements.

10. The mechanical seal of claim 1, wherein the spacer element is configured to rotate with the rotary shaft.

11. The mechanical seal of claim 1, wherein the spacer element has an L-shaped cross section.

12. The mechanical seal of claim 1, wherein the inner surface of the gland is radially spaced from the outer surface of the holder to define a chamber and the spacer element is positioned at an axially inboard seal end of the chamber.

13. The mechanical seal of claim 1, wherein the spacer element comprises a plurality of spacer elements.

14. The mechanical seal of claim 13, wherein the plurality of spacer elements is circumferentially spaced about the outer surface of the holder.

15. The mechanical seal of claim 1, wherein the holder includes a groove disposed at an axially inboard end thereof, and a portion of said spacer element is seated within said groove to axially position the holder.

16. The mechanical seal of claim 1, wherein the holder outer surface includes a tapered surface extending radially inwards towards an axially inboard end of the holder, and said spacer element has sloped inner surface adjacent to and configured complementary to said tapered surface of the holder.

17. The mechanical seal of claim 1, wherein the gland inner surface includes a first axially extending surface, a second axially extending surface and a sloped surface extending between the first axially extending surface and the second axially extending surface at an axially inboard end of the gland, and said spacer element has a sloped outer surface positioned adjacent to and configured complementary to said sloped surface of the gland.

18. The mechanical seal of claim 1, wherein the spacer element is rigidly mounted to a stationary seal component to effect circulation of a fluid between the gland and the holder.

19. The mechanical seal of claim 1, wherein the spacer element is rotatably mounted on a rotatable seal component to effect circulation of a fluid between the gland and the holder.

20. The mechanical seal of claim 1, wherein the holder is axially spaced from the gland assembly.

21. A mechanical seal for mounting to a housing containing a rotating shaft, said mechanical seal comprising:
a gland having an inner surface;
a holder having an outer surface and disposed about said shaft in a selected position relative to the gland, wherein the gland inner surface is radially spaced from the holder outer surface to define a chamber; and
a rotatable spacer element having an L-shaped cross section disposed between the gland and the holder for circulating a fluid through said chamber and for spacing the holder relative to the gland.

22. The mechanical seal of 21, wherein the rotatable spacer element provides substantially uniformly radial spacing of the holder outer surface from said gland inner surface.

23. The mechanical seal of 21, wherein the rotatable spacer element axially positions the holder in said position relative to the gland.

24. The mechanical seal of claim 21, wherein the spacer element rotates about the shaft to circulate the fluid through the chamber.

25. The mechanical seal of claim 21, wherein the holder is positioned within the chamber.

26. The mechanical seal of claim 21, wherein the spacer element is coupled to the outer surface of the holder.

27. The mechanical seal of claim 21, wherein the spacer element is integrally formed on the outer surface of the holder.

28. The mechanical seal of claim 21, wherein the spacer element separates the holder outer surface from the gland inner surface by a distance of between about 0.020 inches and about 0.5 inches.

29. The mechanical seal of claim 21, wherein the spacer element is configured to rotate with the rotary shaft to circulate the process fluid through the chamber.

30. The mechanical seal of claim 21, wherein the spacer element is positioned at an axially inboard seal end of the chamber.

31. The mechanical seal of claim 21, wherein the spacer element comprises a plurality of spacer elements.

32. The mechanical seal of claim 31, wherein the plurality of spacer elements is circumferentially spaced about the outer surface of the holder.

33. The mechanical seal of claim 21, wherein the holder includes a groove disposed at an axially inboard end thereof, and a portion of said spacer element is seated within said groove to axially position the holder.

34. The mechanical seal of claim 21, wherein the holder outer surface includes a tapered surface extending radially inwards towards an axially inboard end of the holder, and said spacer element has sloped inner surface adjacent to and configured complementary to said tapered surface of the holder.

35. The mechanical seal of claim 21, wherein the gland inner surface includes a first axially extending surface, a second axially extending surface and a sloped surface extending between the first axially extending surface and the second axially extending surface at an axially inboard end of the gland, and said spacer element has a sloped outer surface positioned adjacent to and configured complementary to said sloped surface of the gland.

36. The mechanical seal of claim 21, wherein the holder is axially spaced from the gland.

37. The mechanical seal of claim 21, wherein the gland further includes a circulation port and the spacer element rotates to induce a flow of fluid through the chamber via the circulation port.

38. A method for creating a bi-directional axial flow of fluid in a mechanical seal for sealing a housing containing a rotating shaft, comprising:
providing one or more spacer elements;
rotatably mounting the spacer elements between a gland having an inner surface and a holder defining an outer surface and disposed about said shaft in a selected position relative to the gland, wherein the inner surface of the gland is radially spaced from the outer surface of the holder to define a chamber; and
rotating the spacer elements to induce said bi-directional axial flow through the chamber.

39. The method of claim 38, wherein the fluid comprises a process fluid from the housing.

40. The method of claim 38, wherein the step of rotating comprises rotating the spacer elements about the rotating shaft.

41. The method of claim 38, wherein the step of rotating comprises rotating the spacer elements with the rotating shaft.

42. The method of claim 38, wherein the step of rotatably mounting comprises coupling the set of spacer elements to the holder.

43. A mechanical seal for mounting to a housing containing a rotating shaft, said mechanical seal comprising:
a gland having an inner surface;
a holder having an outer surface and disposed about said shaft in a selected position relative to the gland; and
a spacer element disposed between the gland and the holder during operation of the seal for substantially uniformly separating the holder outer surface from said gland inner surface and for axially positioning the holder in said position relative to the gland, wherein the inner surface of the gland is radially spaced from the outer surface of the holder to define a chamber, and the spacer element is located at an axially inboard seal end of the chamber to circulate a fluid flow through the chamber.

44. A mechanical seal for mounting to a housing containing a rotating shaft and process fluid, wherein the mechanical seal seals the process fluid within the housing, said mechanical seal comprising:
a gland having an inner surface;
a holder having an outer surface and disposed about said shaft in a selected position relative to the gland to define a process chamber in fluid communication with the housing; and
a spacer element disposed at an axially inboard end of the seal between the gland and the holder for positioning the holder relative to the shaft and for circulating a process fluid from the housing through the process chamber defined by the gland inner surface and the holder outer surface.

45. The mechanical seal of claim 44, wherein the spacer element rotates about the shaft to circulate the process fluid.

46. The mechanical seal of claim 44, wherein the spacer element is rigidly mounted and held stationary during operation.

47. The mechanical seal of claim 46, wherein the holder rotates to effect circulation of process fluid around the spacer element and through the process chamber.

48. The mechanical seal of claim 44, wherein the spacer element provides axial spacing of the holder relative to the gland.

49. The mechanical seal of claim 44, wherein the spacer element provides radial spacing of the holder relative to the gland.

* * * * *